US012174754B2

(12) United States Patent
Kida et al.

(10) Patent No.: US 12,174,754 B2
(45) Date of Patent: Dec. 24, 2024

(54) TECHNOLOGIES FOR SECURE I/O WITH MEMORY ENCRYPTION ENGINES

(71) Applicant: Intel Corporation, Santa Clara, CA (US)

(72) Inventors: Luis Kida, Beaverton, OR (US); Siddhartha Chhabra, Portland, OR (US); Reshma Lal, Portland, OR (US); Pradeep M. Pappachan, Tualatin, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/060,702

(22) Filed: Dec. 1, 2022

(65) Prior Publication Data

US 2023/0110230 A1     Apr. 13, 2023

Related U.S. Application Data

(63) Continuation of application No. 16/236,074, filed on Dec. 28, 2018, now abandoned.

(Continued)

(51) Int. Cl.
*H04L 29/06* (2006.01)
*G06F 9/38* (2018.01)
(Continued)

(52) U.S. Cl.
CPC ........ *G06F 12/1408* (2013.01); *G06F 9/3877* (2013.01); *G06F 9/45558* (2013.01);
(Continued)

(58) Field of Classification Search
CPC .. G06F 21/1408; G06F 9/3877; G06F 9/0838; G06F 12/0802
See application file for complete search history.

(56) References Cited

U.S. PATENT DOCUMENTS

| 7,523,097 B1 | 4/2009 | Wilson et al. |
| 7,716,389 B1 | 5/2010 | Bruce et al. |

(Continued)

FOREIGN PATENT DOCUMENTS

| CA | 2303297 C | 11/2008 |
| CN | 110618947 A | 12/2019 |

(Continued)

OTHER PUBLICATIONS

Advisory Action, U.S. Appl. No. 16/232,143, Jan. 14, 2022, 3 pages.
(Continued)

*Primary Examiner* — Evans Desrosiers
(74) *Attorney, Agent, or Firm* — NICHOLSON DE VOS WEBSTER & ELLIOTT LLP

(57) ABSTRACT

Technologies for secure I/O data transfer include a computing device having a processor and an accelerator. Each of the processor and the accelerator includes a memory encryption engine. The computing device configures both memory encryption engines with a shared encryption key and transfers encrypted data from a source component to a destination component via an I/O link. The source may be processor and the destination may be the accelerator or vice versa. The computing device may perform a cryptographic operation with one of the memory encryption engines and bypass the other memory encryption engine. The computing device may read encrypted data from a memory of the source, bypass the source memory encryption engine, and transfer the encrypted data to the destination. The destination may receive encrypted data, bypass the destination memory encryption engine, and store the encrypted data in a memory of the destination. Other embodiments are described and claimed.

17 Claims, 4 Drawing Sheets

Related U.S. Application Data

(60) Provisional application No. 62/687,403, filed on Jun. 20, 2018.

(51) Int. Cl.
| | |
|---|---|
| *G06F 9/455* | (2018.01) |
| *G06F 12/0802* | (2016.01) |
| *G06F 12/14* | (2006.01) |
| *G06F 21/57* | (2013.01) |
| *G06F 21/60* | (2013.01) |
| *G06F 21/64* | (2013.01) |
| *G06F 21/76* | (2013.01) |
| *G06F 21/79* | (2013.01) |
| *H04L 9/06* | (2006.01) |
| *H04L 9/08* | (2006.01) |
| *H04L 9/32* | (2006.01) |
| *H04L 41/046* | (2022.01) |
| *H04L 41/28* | (2022.01) |

(52) U.S. Cl.
CPC .......... *G06F 12/0802* (2013.01); *G06F 21/57* (2013.01); *G06F 21/602* (2013.01); *G06F 21/606* (2013.01); *G06F 21/64* (2013.01); *G06F 21/76* (2013.01); *G06F 21/79* (2013.01); *H04L 9/0631* (2013.01); *H04L 9/0637* (2013.01); *H04L 9/083* (2013.01); *H04L 9/0838* (2013.01); *H04L 9/0844* (2013.01); *H04L 9/085* (2013.01); *H04L 9/0891* (2013.01); *H04L 9/321* (2013.01); *H04L 9/3215* (2013.01); *H04L 9/3226* (2013.01); *H04L 9/3268* (2013.01); *H04L 9/3278* (2013.01); *H04L 41/046* (2013.01); *H04L 41/28* (2013.01); *G06F 2009/45591* (2013.01); *G06F 2009/45595* (2013.01)

(56) References Cited

U.S. PATENT DOCUMENTS

| | | | |
|---|---|---|---|
| 9,141,769 | B1 | 9/2015 | Hitchcock et al. |
| 9,215,249 | B2 | 12/2015 | Smith |
| 9,524,399 | B1 | 12/2016 | Takahashi |
| 9,769,123 | B2 | 9/2017 | Grewal et al. |
| 9,954,826 | B2 | 4/2018 | Buer et al. |
| 10,057,243 | B1 | 8/2018 | Kumar et al. |
| 10,291,395 | B1 | 5/2019 | Nenov et al. |
| 10,303,645 | B2 | 5/2019 | Franke et al. |
| 10,419,931 | B1 | 9/2019 | Sohail et al. |
| 10,469,265 | B2 | 11/2019 | Xing |
| 10,515,317 | B1 | 12/2019 | Kenthapadi et al. |
| 10,664,179 | B2 | 5/2020 | Alexandrovich et al. |
| 2003/0235310 | A1* | 12/2003 | Saito ............... H04N 21/42661 348/E5.007 |
| 2004/0250097 | A1* | 12/2004 | Cheung .................. G06F 21/85 713/193 |
| 2006/0126835 | A1 | 6/2006 | Kim et al. |
| 2008/0209203 | A1 | 8/2008 | Haneda |
| 2010/0178977 | A1 | 7/2010 | Kim et al. |
| 2011/0280402 | A1 | 11/2011 | Ibrahim et al. |
| 2011/0314282 | A1 | 12/2011 | Tanaka et al. |
| 2013/0254494 | A1 | 9/2013 | Oxford |
| 2014/0047174 | A1 | 2/2014 | Sakthikumar et al. |
| 2014/0056307 | A1 | 2/2014 | Hutchison et al. |
| 2014/0177823 | A1 | 6/2014 | Gopal et al. |
| 2014/0281544 | A1 | 9/2014 | Paczkowski et al. |
| 2014/0281587 | A1 | 9/2014 | Ignatchenko |
| 2014/0304649 | A1 | 10/2014 | Phegade et al. |
| 2015/0113241 | A1 | 4/2015 | Martin et al. |
| 2015/0244530 | A1 | 8/2015 | Clayton et al. |
| 2015/0249654 | A1 | 9/2015 | Mundra et al. |
| 2015/0347768 | A1 | 12/2015 | Martin et al. |
| 2016/0119318 | A1 | 4/2016 | Zollinger et al. |
| 2016/0277372 | A1 | 9/2016 | Shah et al. |
| 2016/0352701 | A1 | 12/2016 | Vora et al. |
| 2016/0381005 | A1 | 12/2016 | Vij et al. |
| 2017/0005809 | A1 | 1/2017 | Adam et al. |
| 2017/0006030 | A1 | 1/2017 | Krishnamoorthy et al. |
| 2017/0024568 | A1 | 1/2017 | Pappachan et al. |
| 2017/0024569 | A1 | 1/2017 | Xing et al. |
| 2017/0024570 | A1 | 1/2017 | Pappachan et al. |
| 2017/0026171 | A1 | 1/2017 | Lal et al. |
| 2017/0093571 | A1 | 3/2017 | Satpathy et al. |
| 2017/0104597 | A1 | 4/2017 | Negi et al. |
| 2017/0171194 | A1 | 6/2017 | Durham et al. |
| 2017/0185514 | A1 | 6/2017 | Blinzer |
| 2018/0062829 | A1 | 3/2018 | Suresh et al. |
| 2018/0084415 | A1 | 3/2018 | Babbage |
| 2018/0107608 | A1 | 4/2018 | Kaplan et al. |
| 2018/0114013 | A1 | 4/2018 | Sood et al. |
| 2018/0365406 | A1 | 12/2018 | Elnekaveh et al. |
| 2018/0365424 | A1 | 12/2018 | Callaghan et al. |
| 2019/0013965 | A1 | 1/2019 | Sindhu et al. |
| 2019/0044724 | A1 | 2/2019 | Sood et al. |
| 2019/0081776 | A1 | 3/2019 | Satou |
| 2019/0132136 | A1 | 5/2019 | Scarlata et al. |
| 2019/0319785 | A1 | 10/2019 | Kumar et al. |
| 2020/0159657 | A1 | 5/2020 | Kida et al. |
| 2021/0081577 | A1 | 3/2021 | Zhang et al. |

FOREIGN PATENT DOCUMENTS

| | | |
|---|---|---|
| DE | 102019113352 A1 | 12/2019 |
| WO | 99/14881 A2 | 3/1999 |
| WO | 2013/081441 A1 | 6/2013 |

OTHER PUBLICATIONS

Advisory Action, U.S. Appl. No. 16/234,726, Dec. 1, 2022, 3 pages.
Advisory Action, U.S. Appl. No. 16/234,726, Sep. 20, 2021, 3 pages.
Advisory Action, U.S. Appl. No. 16/236,074, Jul. 25, 2022, 2 pages.
Final Office Action, U.S. Appl. No. 16/232,143, Oct. 25, 2021, 51 pages.
Final Office Action, U.S. Appl. No. 16/234,726, Jul. 20, 2022, 19 pages.
Final Office Action, U.S. Appl. No. 16/234,726, Jun. 8, 2021, 17 pages.
Final Office Action, U.S. Appl. No. 16/236,074, May 10, 2022, 18 pages.
Final Office Action, U.S. Appl. No. 17/496,147, Mar. 21, 2023, 13 pages.
Final Office Action, U.S. Appl. No. 17/543,267, Jan. 11, 2024, 6 pages.
Hu et al., "Certificate Revocation Guard (CRG): An Efficient Mechanism for Checking Certificate Revocation," 2016 IEEE 41st Conference on Local Computer Networks (LCN), Dubai, 2016, pp. 527-530.
Non-Final Office Action, U.S. Appl. No. 16/232,139, Jan. 14, 2021, 15 pages.
Non-Final Office Action, U.S. Appl. No. 16/232,143, Jan. 15, 2021, 43 pages.
Non-Final Office Action, U.S. Appl. No. 16/232,143, Jul. 8, 2021, 48 pages.
Non-Final Office Action, U.S. Appl. No. 16/234,726, Dec. 16, 2021, 22 pages.
Non-Final Office Action, U.S. Appl. No. 16/234,726, Jan. 13, 2021, 16 pages.
Non-Final Office Action, U.S. Appl. No. 16/236,074, Dec. 10, 2021, 15 pages.
Non-Final Office Action, U.S. Appl. No. 16/444,053, Dec. 9, 2021, 12 pages.
Non-Final Office Action, U.S. Appl. No. 17/446,194, Oct. 12, 2023, 11 pages.
Non-Final Office Action, U.S. Appl. No. 17/496,147, Nov. 10, 2022, 12 pages.

(56) References Cited

OTHER PUBLICATIONS

Non-Final Office Action, U.S. Appl. No. 17/543,267, Mar. 30, 2023, 17 pages.
Non-Final Office Action, U.S. Appl. No. 17/724,743, Nov. 25, 2022, 42 pages.
Notice of Allowance, U.S. Appl. No. 16/232,139, Jul. 8, 2021, 11 pages.
Notice of Allowance, U.S. Appl. No. 16/232,143, Apr. 26, 2022, 2 pages.
Notice of Allowance, U.S. Appl. No. 16/232,143, Mar. 11, 2022, 22 pages.
Notice of Allowance, U.S. Appl. No. 16/232,146, May 28, 2021, 22 pages.
Notice of Allowance, U.S. Appl. No. 16/234,726, Jan. 19, 2023, 12 pages.
Notice of Allowance, U.S. Appl. No. 16/236,074, Sep. 2, 2022, 12 pages.
Notice of Allowance, U.S. Appl. No. 16/444,053, Apr. 18, 2022, 8 pages.
Notice of Allowance, U.S. Appl. No. 17/724,743, Mar. 21, 2023, 10 pages.
Final Office Action, U.S. Appl. No. 17/446,194, May 9, 2024, 12 pages.
Notice of Allowance, U.S. Appl. No. 17/543,267, May 13, 2024, 8 pages.

\* cited by examiner

TECHNOLOGIES FOR SECURE I/O WITH MEMORY ENCRYPTION ENGINES

CROSS-REFERENCE TO RELATED APPLICATION

This Application is a continuation of and claims the benefit of and priority to U.S. application Ser. No. 16/236,074, entitled TECHNOLOGIES FOR SECURE I/O WITH MEMORY ENCRYPTION ENGINES, by Luis Kida, et al., filed Dec. 28, 2018, now allowed, which claims the benefit of and priority to U.S. Provisional Patent Application No. 62/687,403, filed Jun. 20, 2018, the entire contents of which are incorporated herein by reference.

BACKGROUND

Current processors may provide support for a trusted execution environment such as a secure enclave. Secure enclaves include segments of memory (including code and/or data) protected by the processor from unauthorized access including unauthorized reads and writes. In particular, certain processors may include Intel® Software Guard Extensions (SGX) to provide secure enclave support. In particular, SGX provides confidentiality, integrity, and replay-protection to the secure enclave data while the data is resident in the platform memory and thus provides protection against both software and hardware attacks. The on-chip boundary forms a natural security boundary, where data and code may be stored in cleartext and assumed to be secure. Intel® SGX does not protect I/O data that moves across the on-chip boundary.

Modern computing devices may include general-purpose processor cores as well as a variety of hardware accelerators for offloading compute-intensive workloads or performing specialized tasks. Hardware accelerators may include, for example, one or more field-programmable gate arrays (FPGAs), which may include programmable digital logic resources that may be configured by the end user or system integrator. Hardware accelerators may also include one or more application-specific integrated circuits (ASICs). Hardware accelerators may be embodied as I/O devices that communicate with the processor core over an I/O interconnect.

Certain computing devices support total memory encryption to prevent certain hardware attacks. For example, platforms may include memory encryption engines on the path to memory that encrypt or decrypt data as it moves to and from memory. Similar, certain I/O devices or other components may include integrated link encryption that protects data as it travels over an I/O link. Thus, certain computing devices may perform two encryption operations for certain data, for both memory encryption and link encryption.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
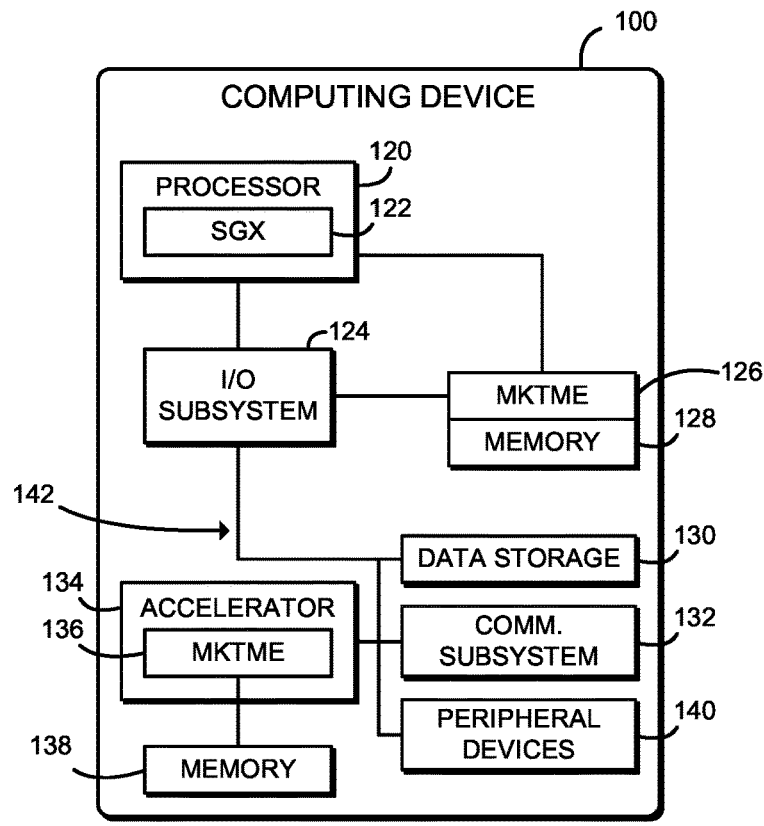
FIG. 1 is a simplified block diagram of at least one embodiment of a computing device for secure I/O with memory encryption engines.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a computing device 100 for secure I/O with an accelerator device includes a processor 120 and an accelerator 134, such as a field-programmable gate array (FPGA). Each of the processor 120 and the accelerator 134 includes or otherwise uses a memory encryption engine, such as a multi-key total memory encryption (MKTME) engine. In use, as described further below, the memory encryption engines of each of the processor 120 and the accelerator 134 are programmed with a shared encryption key. Data is transferred between the processor 120 and the accelerator 134 over an I/O link (e.g., a PCI Express (PCIe) link, an Intel Accelerator Link (IAL) link, or other physical link) that may be exposed to physical attackers. To protect against physical attacks, the data transferred over the link is encrypted by the memory encryption engines. The computing device 100 may bypass one of the memory encryption engines of the processor 120 or the accelerator 134 in order to avoid performing decryption and encryption of the same data twice or to otherwise improve performance. Additionally, although illustrated as protecting data transferred between a processor 120 and an accelerator 134, it should be understood that the technologies disclosed herein may protect any I/O link between components with memory encryption engines. Thus, the computing device 100 may protect data transferred over an I/O link efficiently, without performing multiple encryption/decryption operations on the same data. For example, the computing device 100 may save at least one encryption and one decryption operation per data transfer as compared to typical systems that perform separate memory encryption and link encryption operations. Furthermore, by bypassing a memory encryption engine, the computing device 100 may avoid transmitting cryptographic tweak information over the I/O link, which may reduce bandwidth usage. Additionally, by performing link encryption using the memory encryption engines, the link encryption does not need to be performed by application software. Thus, the computing device 100 may improve performance/power consumption and/or reduce processor utilization by removing certain cryptographic operations from software.

The computing device 100 may be embodied as any type of device capable of performing the functions described herein. For example, the computing device 100 may be embodied as, without limitation, a computer, a laptop computer, a tablet computer, a notebook computer, a mobile computing device, a smartphone, a wearable computing device, a multiprocessor system, a server, a workstation, and/or a consumer electronic device. As shown in FIG. 1, the illustrative computing device 100 includes a processor 120, an I/O subsystem 124, a memory 128, and a data storage device 130. Additionally, in some embodiments, one or more of the illustrative components may be incorporated in, or otherwise form a portion of, another component. For example, the memory 128, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. As shown, the processor 120 illustratively includes secure enclave support 122, which allows the processor 120 to establish a trusted execution environment known as a secure enclave, in which executing code may be measured, verified, and/or otherwise determined to be authentic. Additionally, code and data included in the secure enclave may be encrypted or otherwise protected from being accessed by code executing outside of the secure enclave. For example, code and data included in the secure enclave may be protected by hardware protection mechanisms of the processor 120 while being executed or while being stored in certain protected cache memory of the processor 120. The code and data included in the secure enclave may be encrypted when stored in a shared cache or the main memory 128. The secure enclave support 122 may be embodied as a set of processor instruction extensions that allows the processor 120 to establish one or more secure enclaves in the memory 128. For example, the secure enclave support 122 may be embodied as Intel® Software Guard Extensions (SGX) technology.

The memory 128 may be embodied as any type of volatile or non-volatile memory or data storage capable of performing the functions described herein. In operation, the memory 128 may store various data and software used during operation of the computing device 100 such as operating systems, applications, programs, libraries, and drivers. As shown, the memory 128 is coupled to the processor 120 and/or the I/O subsystem 124 via a multi-key total memory encryption engine (MKTME) 126, which may be included in or otherwise coupled to a memory controller, integrated memory controller hub, or other memory interface. The MKTME 126 allows the computing device 100 to transparently encrypt the contents of the memory 128. The MKTME 126 maintains a table or other internal, protected structure with multiple encryption keys, which are used to encrypt and decrypt data as it is stored to and read from the memory 128, respectively. The encryption keys are illustratively 128-bit AES XTS keys although may be embodied as any symmetric, asymmetric, or other encryption key. The encryption key may be selected by the MKTME 126 on a per-page basis, for example based on a key identifier included in one or more otherwise unused upper bits of the physical memory page address for a particular memory access. In those embodiments, an operating system, virtual memory monitor, or other supervisory component of the computing device 100 may control access to particular memory pages by configuring one or more page tables and/or extended page tables with the appropriate key identifiers. MKTME keys may be generated by the MKTME 126, in which case they are not disclosed outside of the SoC, or may be supplied by software. In some embodiments, the MKTME 126 may include support for Intel Trusted Domain Extensions (TDX). With TDX, the MKTME 126 may accept an external "domain" key, also called a "user" or "tenant" key. The MKTME 126 may also use a default key that is self-generated to protect memory used by MKTME and Intel SGX as well as Intel TDX. Although illustrated as coupled between the memory 128 and the processor 120 and I/O subsystem 124, it should be understood that in some embodiments, the MKTME 126 may be included in the processor 120, in the I/O subsystem 124, or other component of the computing device 100.

As shown, the processor 120 is communicatively coupled to the I/O subsystem 124, which may be embodied as circuitry and/or components to facilitate input/output operations with the processor 120, the memory 128, and other components of the computing device 100. For example, the I/O subsystem 124 may be embodied as, or otherwise include, memory controller hubs, input/output control hubs, sensor hubs, host controllers, firmware devices, communication links (i.e., point-to-point links, bus links, wires, cables, light guides, printed circuit board traces, etc.) and/or other components and subsystems to facilitate the input/output operations. As shown, the memory 128 may be directly coupled to the processor 120, for example via an integrated memory controller hub. Additionally, in some embodiments, the I/O subsystem 124 may form a portion of a system-on-a-chip (SoC) and be incorporated, along with the processor 120, the memory 128, the accelerator 134, and/or other components of the computing device 100, on a single integrated circuit chip. Additionally or alternatively, in some embodiments the processor 120 may include an integrated memory controller and a system agent, which may be embodied as a logic block in which data traffic from processor cores and I/O devices converges before being sent to the memory 128.

The data storage device 130 may be embodied as any type of device or devices configured for short-term or long-term storage of data such as, for example, memory devices and circuits, memory cards, hard disk drives, solid-state drives, non-volatile flash memory, or other data storage devices. The computing device 100 may also include a communications subsystem 132, which may be embodied as any communication circuit, device, or collection thereof, capable of enabling communications between the computing device 100 and other remote devices over a computer network (not shown). The communications subsystem 132 may be configured to use any one or more communication technology (e.g., wired or wireless communications) and associated protocols (e.g., Ethernet, Bluetooth®, Wi-Fi®, WiMAX, 3G, 4G LTE, etc.) to effect such communication.

The accelerator 134 may be embodied as a field-programmable gate array (FPGA), an application-specific integrated circuit (ASIC), a graphics processor unit (GPU), a coprocessor, an I/O device, or other digital logic device capable of performing accelerated functions (e.g., accelerated application functions, accelerated network functions, or other accelerated functions). Illustratively, the accelerator 134 is an FPGA, which may be embodied as an integrated circuit including programmable digital logic resources that may be configured after manufacture. The FPGA may include, for example, a configurable array of logic blocks in communication over a configurable data interchange.

As shown, the illustrative accelerator 134 also includes an MKTME 136. Similar to the MKTME 126, the MKTME 136 allows the accelerator 134 to transparently encrypt the contents of a memory 138 coupled to the accelerator 134. Accordingly, the description of the MKTME 126 is also applicable to the MKTME 136 and is not repeated. The memory 138 which may be embodied as an internal or external DRAM, VRAM, or other memory coupled to the accelerator 134. Similar to the memory 128, the contents of the memory 138 are transparently encrypted, which may prevent certain hardware attacks. In some embodiments, the memory 128 and the memory 138 may be included in a unified address space.

As shown, the computing device 100 may further include one or more peripheral devices 140. The peripheral devices 140 may include any number of additional input/output devices, interface devices, hardware accelerators, and/or other peripheral devices. For example, in some embodiments, the peripheral devices 140 may include a touch screen, graphics circuitry, a graphical processing unit (GPU) and/or processor graphics, an audio device, a microphone, a camera, a keyboard, a mouse, a network interface, and/or other input/output devices, interface devices, and/or peripheral devices.

As shown in FIG. 1, the accelerator 134 may be coupled to the processor 120 via a link 142, which may be embodied as a high-speed connection interface such as a peripheral bus (e.g., a PCI Express bus or an Intel Accelerator Link (IAL) bus (e.g., IAL.io or IAL.mem)) or an inter-processor interconnect (e.g., an in-die interconnect (IDI) or QuickPath Interconect (QPI)), or any other appropriate interconnect. The link 142 may include one or more buses, point-to-point links, lanes, switches, or other board-level components. Thus, data transferred in cleartext over the link 142 may be vulnerable to certain physical attacks.

Figure 2:
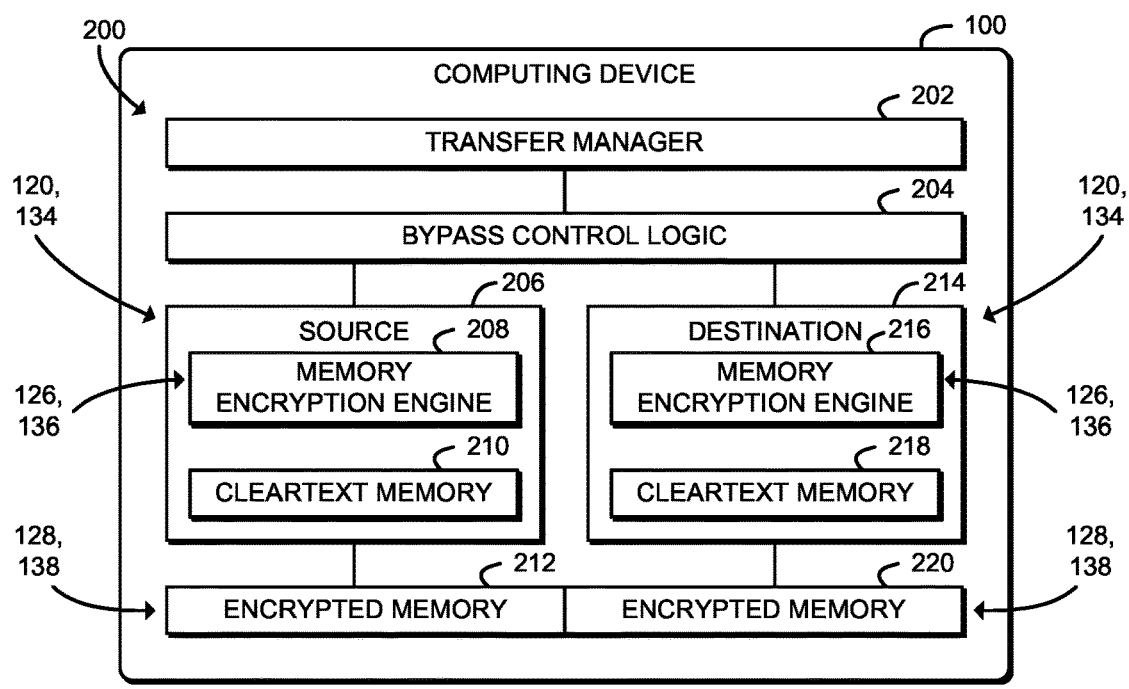
FIG. 2 is a simplified block diagram of at least one embodiment of an environment of the computing device of FIG. 1.

Referring now to FIG. 2, in an illustrative embodiment, the computing device 100 establishes an environment 200 during operation. The illustrative environment 200 includes a transfer manager 202, bypass control logic 204, a source 206 including a memory encryption engine 208, and a destination 214 including a memory encryption engine 216. The various components of the environment 200 may be embodied as hardware, firmware, software, or a combination thereof. As such, in some embodiments, one or more of the components of the environment 200 may be embodied as circuitry or collection of electrical devices (e.g., transfer manager circuitry 202, bypass control logic circuitry 204, and/or memory encryption engine circuitry 208, 216). It should be appreciated that, in such embodiments, one or more of the transfer manager circuitry 202, the bypass control logic circuitry 204, and/or the memory encryption engine circuitry 208, 216 may form a portion of the processor 120, the I/O subsystem 124, the accelerator 134, the MKTME 126, 136, and/or other components of the computing device 100. Additionally, in some embodiments, one or more of the illustrative components may form a portion of another component and/or one or more of the illustrative components may be independent of one another.

The transfer manager 202 may be embodied as or otherwise include a trusted application, one or more secure enclaves established using the secure enclave support 122, or other trusted execution environment. The transfer manager 202 is configured to configure the memory encryption engines 208, 216 with a shared encryption key. The transfer manager 202 is further configured to cause a transfer of encrypted data from the source component 206 to the destination component 214 via an I/O link between those components 206, 214 (e.g. the I/O link 142). The encrypted data is encrypted with the shared encryption key.

The source 206 and the destination 214 may be embodied as any components of the computing device 100 connected by an I/O link, such as the processor 120 and the accelerator 134. In some embodiments, each of the processor 120 and the accelerator 134 may be capable of performing the functions of both the source 206 and the destination 214, depending on the direction of data transferred over the I/O link. Accordingly, both of the MKTME 126, 136 may be capable of performing the functions of both memory encryption engines 208, 216, depending on the direction of data transfer. For example, for a transfer from the processor 120 to the accelerator 134 over the I/O link 142, the source 206 may be embodied as the processor 120, the memory encryption engine 208 may be embodied as the MKTME 126, the destination 214 may be embodied as the accelerator 134, and the memory encryption engine 216 may be embodied as the MKTME 136. As another example, for a transfer from the accelerator 134 to the processor 120 over the I/O link 142, the source 206 may be embodied as the accelerator 134, the memory encryption engine 208 may be embodied as the MKTME 136, the destination 214 may be embodied as the processor 120, and the memory encryption engine 216 may be embodied as the MKTME 126.

As shown, each of the source 206 and the destination 214 includes a cleartext memory 210, 218, respectively. The cleartext memory 210, 218 may be embodied as any register, cache, private memory, or other memory of the component 206, 214 that may securely store data in cleartext (i.e., not encrypted). The cleartext memory 210, 218 may be private memory that is not addressable by the other components 214, 206 and not accessible to physical attack, such as memory integrated into the component 206, 214. The cleartext memory 210, 218 may also be addressable memory that is protected from unauthorized access by hardware access control and is not accessible to physical attack, such as cache or registers integrated into the component 206, 214. For example, the cleartext memory 210, 218 may be embodied as a register, register file, or cache of the processor 120. As another example, the cleartext memory 210, 218 may be embodied as one or more registers or private memory of the accelerator 134.

Additionally, each of the source 206 and the destination 214 are coupled to an encrypted memory 212, 220, respectively. The encrypted memory 212, 220 may be embodied as any memory or other storage that is encrypted at rest to protect from certain hardware attacks, for example by the memory encryption engines 208, 216. For example, the encrypted memory 212, 220 may be embodied as the main memory 128 coupled to the processor 120 and protected by the MKTME 126. As another example, the encrypted memory 212, 220 may be embodied as the memory 138 coupled to the accelerator 134 (e.g., DRAM or VRAM) and protected by the MKTME 136. As described further below, data stored in the encrypted memory 212, 220 may be addressable or otherwise accessible by both the source 206 and the destination 214. In some embodiments, the encrypted memory 212, 220 may be included in a unified address space.

The bypass control logic 204 is configured to determine whether to bypass either of the memory encryption engines 208, 216, and, if so, to bypass that memory encryption engine 208, 216. The bypass control logic 204 may determine whether to bypass the memory encryption engines 208, 216 based on a device configuration of the corresponding source 206 or destination 214 and/or based on a memory address associated with a transfer of encrypted data. The bypass control logic 204 may determine whether to bypass the memory encryption engines 208, 216 based on whether the data source is the cleartext memory 210 or the encrypted memory 212 and whether the data destination is the cleartext memory 218 or the encrypted memory 220. The bypass control logic 204 may determine whether to bypass the memory encryption engines 208, 216 based on whether a source address tweak or a destination address tweak is available to the memory encryption engines 208, 216. The bypass control logic 204 is configured to read encrypted data from the encrypted memory 212 of the source 206 if the memory encryption engine 208 is bypassed. The bypass control logic 204 is configured to write encrypted data to the encrypted memory 220 of the destination 214 if the memory encryption engine 216 is bypassed.

Each of the memory encryption engines 208, 216 is configured to perform a cryptographic operation (i.e., encryption or decryption) related to encrypted data transferred via the I/O link. The particular operations performed depend on the direction of transfer, the source and destination memory locations (e.g., in private memory or addressable memory), and whether any of the memory encryption engines 208, 216 are bypassed.

The memory encryption engine 208 may be configured to read encrypted data from an encrypted memory 212 coupled to the source 206, decrypt the encrypted data to recover cleartext data using the shared encryption key and a tweak associated with the source 206 (e.g., a source address). The memory encryption engine 208 may be configured to read cleartext data from a cleartext memory 210 of the source 206. The memory encryption engine 208 may be configured to encrypt the cleartext data using the shared encryption key and a tweak associated with the destination 214 (e.g., a destination address) or a tweak associated with the source 206 (e.g., a source address).

The memory encryption engine 216 may be configured to decrypt encrypted data received via the I/O link to recover cleartext data using the shared encryption key and a tweak associated with the source 206 (e.g., a source address) or the destination 214 (e.g., a destination address). The memory encryption engine 216 may be configured to store the cleartext data in a cleartext memory 218 of the destination 214. The memory encryption engine 216 may be further configured to encrypt the cleartext data using the shared encryption key and a tweak associated with the destination 214 and to store the encrypted data in an encrypted memory 220 coupled to the destination 214.

Figure 3:
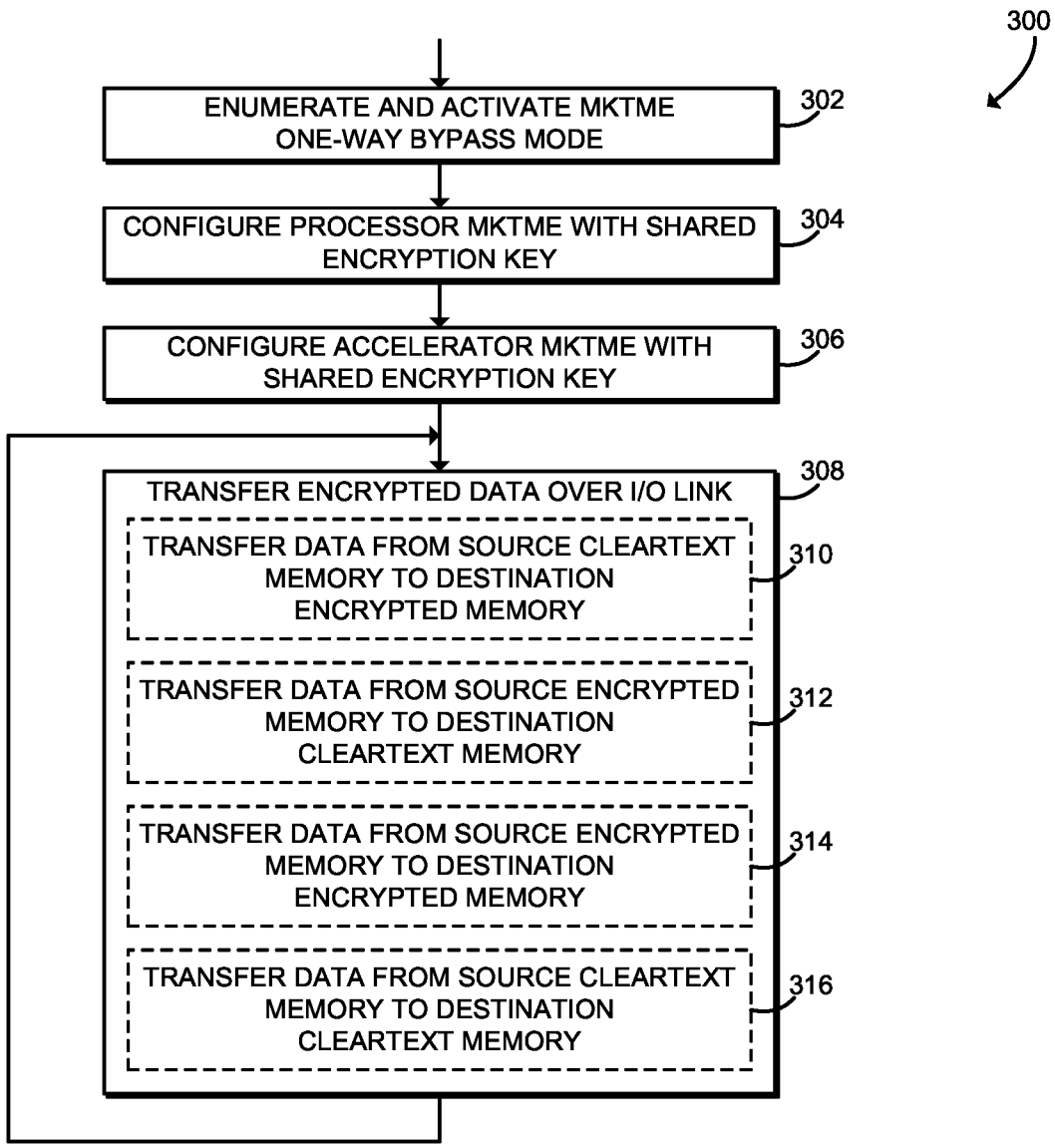
FIG. 3 is a simplified flow diagram of at least one embodiment of a method for secure I/O transfers with memory encryption engines that may be executed by the computing device of FIGS. 1-2.

Referring now to FIG. 3, in use, the computing device 100 may execute a method 300 for secure I/O transfers with memory encryption engines. It should be appreciated that, in some embodiments, the operations of the method 300 may be performed by one or more components of the environment 200 of the computing device 100 as shown in FIG. 2. The method 300 begins in block 302, in which the computing device 100 enumerates and activates an appropriate one-way bypass mode (OWM) in the MKTME 126 and the MKTME 136 of the accelerator 134. In the one-way mode, data may bypass the memory encryption engine 208, 216 on certain transactions between components 206, 214 with compatible cryptographic capabilities. Trusted software may configure the memory encryption engines 208, 216 in the one-way mode for compatible devices. For example, the OWM capability of the MKTME 126, 136 may be enumerated in a model-specific register of the processor 120 (e.g., IA32_TME_CAPABILITY) and activated by BIOS or another firmware environment of the computing device 100. The OWM mode may be configured by software (e.g., driver software, operating system software, or other software), for example using a PFCONFIG instruction. Operation in the OWM may require compatible devices on either end of the I/O link (e.g., the MKTME 126, 136 on both ends of the link 142). Compatible devices may enable the OWM mode for transfers to or from certain devices or certain predetermined memory addresses or address ranges.

In block 304, the computing device 100 configures the MKTME 126 with an encryption key. The encryption key may be any appropriate encryption key that is known by the processor 120 (e.g., by a trusted application or other trusted component) and the accelerator 134. For example, the encryption key may be embodied as a private key of a trust domain (TD) of the computing device 100. The encryption key may be securely programmed to the MKTME 126 using one or more specialized processor instructions, such as XBIND, PCONFIG.UNWRAP, and/or other instructions. The MKTME 126 may be configured by a trusted application or other trusted component of the computing device 100. In block 306, the computing device 100 configures the MKTME 136 of the accelerator 134 with the same encryption key as the MKTME 126. Similarly, the encryption key may be securely programmed to the MKTME 136 using one or more specialized processor instructions, such as XBIND, PCONFIG.UNWRAP, and/or other instructions.

In block 308, the computing device 100 securely transfers data via the I/O link 142 between the processor 120 and the accelerator 134. Data may be transferred in either direction (e.g., from the processor 120 to the accelerator 134 or from the accelerator 134 to the processor 120). In some embodiments, data transfers may be originated by either of the processor 120 or the accelerator 134. For example, the processor 120 may originate a write to the accelerator 134 and originate a read from the accelerator 134, and vice versa. The data transferred over the I/O link 142 is encrypted using the shared encryption key and a tweak. The tweak may be a source memory address or a destination memory address of the transferred data, such as a host physical address or other address. As described further below, the MKTME 126, 136 are used to perform cryptographic operations (e.g., encryption or decryption) on the encrypted data. One of the MKTME 126, 136 may be bypassed for certain transfers (e.g., by reading or writing encrypted data directly with encrypted memory 128, 138). As described below, the particular MKTME 126, 136 that is bypassed may depend on the originator of the data transfer and whether an appropriate tweak is available at each MKTME 126, 136.

In some embodiments, in block 310 the computing device 100 may transfer data from a source cleartext memory 210 to a destination encrypted memory 220. As described above, the source cleartext memory 210 may be embodied as any memory of the source component 206 (e.g., the processor 120 or the accelerator 134) that stores data in cleartext, that is, without encryption. The destination encrypted memory 220 may be embodied as any memory included in or coupled to the destination component 214 (e.g., the memory 128 coupled to the processor 120 or the memory 138 coupled to the accelerator 134) that stores encrypted data. During the transfer, the computing device 100 may bypass the memory encryption engine 216 of the destination 214 (e.g. one of the MKTME 126, 136).

In some embodiments, in block 312 the computing device 100 may transfer data from an encrypted memory 212 of the source 206 to a cleartext memory 218 of the destination 214. During the transfer, the computing device 100 may bypass the memory encryption engine 208 of the source 206 (e.g. one of the MKTME 126, 136).

In some embodiments, in block 314, the computing device 100 may transfer data from an encrypted memory 212 of the source 206 to an encrypted memory 220 of the destination 214. During the transfer, the computing device 100 may bypass the memory encryption engine 208, 216 of either the source 206 or the destination 214 (e.g. one of the MKTME 126, 136). The memory encryption engine 208, 216 of the other component may perform two cryptographic operations (e.g., to decrypt and then re-encrypt with the correct tweak).

In some embodiments, in block 316, the computing device 100 may transfer data from a cleartext memory 210 of the source 206 to a cleartext memory 218 of the destination 214. During the transfer, the computing device 100 may perform one cryptographic operation with each memory encryption engine 208, 216 of the source 206 and the destination 214 (e.g., each of the MKTME 126, 136). Encrypted data transferred over the I/O link is thus protected using the memory encryption engines 208, 216. After performing the transfer, the method 300 loops back to block 308 to continue transferring encrypted data.

Figure 4:
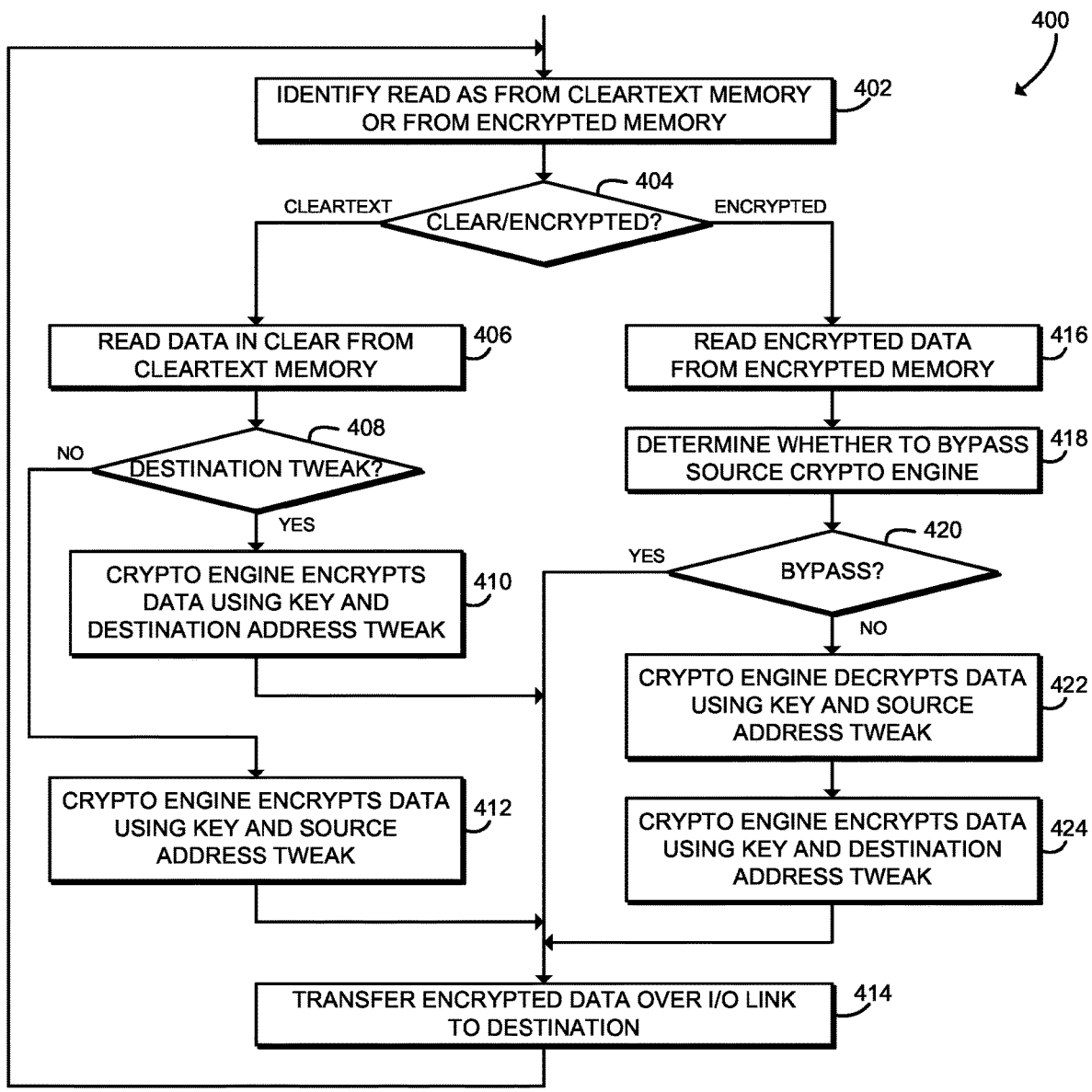
FIG. 4 is a simplified flow diagram of at least one embodiment of a method for source component transfers that may be executed by the computing device of FIGS. 1-2.

Referring now to FIG. 4, in use, the computing device 100 may execute a method 400 for source component transfers.

It should be appreciated that, in some embodiments, the operations of the method 400 may be performed by one or more components of the environment 200 of the computing device 100 as shown in FIG. 2, such as the source 206 (e.g., the processor 120 or the accelerator 134, depending on the direction of the transfer). The method 400 begins in block 402, in which the source 206 determines whether a memory read is from a cleartext memory 210 of the source 206 or from an encrypted memory 212 of the source 206. The memory read may identify an address, register name, or other location as a source of data to be transferred. As described above, the cleartext memory 210 may be embodied as any register, cache, private memory, or other memory of the source 206 (e.g., the processor 120 or the accelerator 134) that may securely store data in cleartext (i.e., not encrypted). The encrypted memory 212 may be embodied as any memory or other storage coupled to the source 206 that is encrypted at rest to protect from certain hardware attacks (e.g., the memory 128 coupled to the processor 120 or the memory 138 coupled to the accelerator 134). In block 404 the source 206 checks whether the read is from cleartext memory 210 or encrypted memory 212. If the read is from encrypted memory 212, the method 400 branches to block 416, described below. If the read is from cleartext memory 210, the method 400 branches to block 406.

In block 406, the memory encryption engine 208 reads cleartext data from the cleartext memory 210 of the source 206. The memory encryption engine 208 may, for example, read the cleartext data from an internal bus, data port, secure fabric, sideband network, or other secure interface between the memory encryption engine 208 and the cleartext memory 210. Routing control may prevent cleartext data traveling from the cleartext memory 210 to the destination 214 without first passing through the memory encryption engine 208. Only certain unsecure (legacy) transfers may travel in cleartext from the cleartext memory 210 over an I/O link.

In block 408, the memory encryption engine 208 determines whether a destination address tweak is available for the data transfer. The tweak may be embodied as, for example, a host physical address for the encrypted data in the encrypted memory 220 of the destination 214. Whether the destination tweak is known by the memory encryption engine 208 of the source 206 may depend on the originator of the data transfer relative to the source 206 and the destination 214, for example whether the operation is a "read" or a "write" from the perspective of the source 206 and the destination 214. For example, if the data transfer is a "write" (originated by the source 206), the source 206 may know the destination address tweak. If the transfer is a "read" (originated by the destination 214), the source 206 may not know any destination address associated with the transfer.

If the destination address tweak is available, the method 400 branches to block 410, in which the memory encryption engine 208 encrypts the cleartext data using the shared encryption key and the destination address tweak. After encrypting the data, the method 400 advances to block 414, in which the source 206 transfers encrypted data over the I/O link 142 to the destination 214 (e.g., to the processor 120 or the accelerator 134). The encrypted data may be transferred with a memory-mapped I/O (MMIO) transaction, a direct memory access (DMA) transaction, or other data transfer. As described further below in connection with FIG. 5, the destination memory encryption engine 216 may decrypt the encrypted data, or the destination memory encryption engine

216 may be bypassed. After transferring the encrypted data, the method 400 loops back to block 402 to continue processing data transfers.

Referring back to block 408, if the destination address tweak is not available, then the method 400 branches to block 412, in which the memory encryption engine 208 encrypts the cleartext data using the shared encryption key and a source address tweak. After encrypting the data, the method 400 advances to block 414 to transfer the encrypted data over the I/O link 142 to the destination 214 as described above. After transferring the encrypted data, the method 400 loops back to block 402 to continue processing data transfers.

Referring back to block 404, if the read is from encrypted memory 212, the method 400 branches to block 416, in which the source 206 reads encrypted data from the encrypted memory 212. The source 206 may read the encrypted data from a memory controller, memory bus, data port, secure fabric, sideband network, or other communication link between the memory encryption engine 208 and the encrypted memory 212.

In block 418, the source 206 determines whether to bypass the memory encryption engine 208. The determination of whether to bypass the memory encryption engine 208 may depend on which of the source 206 and/or the destination 214 knows the source address tweak and/or destination address tweak associated with the data transfer. As described above, whether the source or destination tweak is available to the source 206 or destination 214 may depend on the originator of the data transfer relative to the source 206 and the destination 214. For example, for a "read," the destination 214 may know the source address of the data transfer, and thus the source memory encryption engine 208 may be bypassed. As another example, for a "write," the source 206 may know the destination address of the data transfer, and thus the destination memory encryption engine 216 may be bypassed. Accordingly, in some embodiments, the memory encryption engine 208 may be bypassed for transfers from the encrypted memory 212 of the source 206 to cleartext memory 218 of the destination 214, and the memory encryption engine 208 may not be bypassed for transfers from the encrypted memory 212 of the source 206 to encrypted memory 220 of the destination 214.

In block 420, the source 206 checks whether to bypass the memory encryption engine 208. If so, the method 400 branches to block 414, in which the source 206 transfers encrypted data from the encrypted memory 212 over the I/O link 142 to the destination 214, as described above. The memory encryption engine 208 is bypassed and does not perform cryptographic operations on the encrypted data read from the encrypted memory 212. The encrypted data may be decrypted by the destination 214 using the shared key and a source address tweak as described below in connection with FIG. 5. After transferring the encrypted data, the method 400 loops back to block 402 to continue processing data transfers.

Referring back to block 420, if the source 206 determines not to bypass the memory encryption engine 208, the method 400 branches to block 422, in which the memory encryption engine 208 decrypts the encrypted data using the shared encryption key and a source address tweak, which recovers cleartext data. The source address tweak may be embodied as, for example, a host physical address of the encrypted data in the encrypted memory 212. In block 424, the memory encryption engine 208 encrypts the cleartext data using the shared encryption key and a destination address tweak. The tweak may be embodied as, for example, a host physical address for the encrypted data in the encrypted memory 220 of the destination 214. Additionally or alternatively, although illustrated as including a single memory encryption engine 208 that performs two cryptographic operations in blocks 422, 424, it should be understood that in some embodiments the source 206 may include two memory encryption engines to perform those operations. After encrypting the data, the method 400 advances to block 414, in which the source 206 transfers encrypted data over the I/O link 142 to the destination 214, as described above. The encrypted data may be decrypted by the destination 214 using the shared key and the destination address tweak, or decryption may be bypassed by the destination 214 as described below in connection with FIG. 5. After transferring the encrypted data, the method 400 loops back to block 402 to continue processing data transfers.

Figure 5:
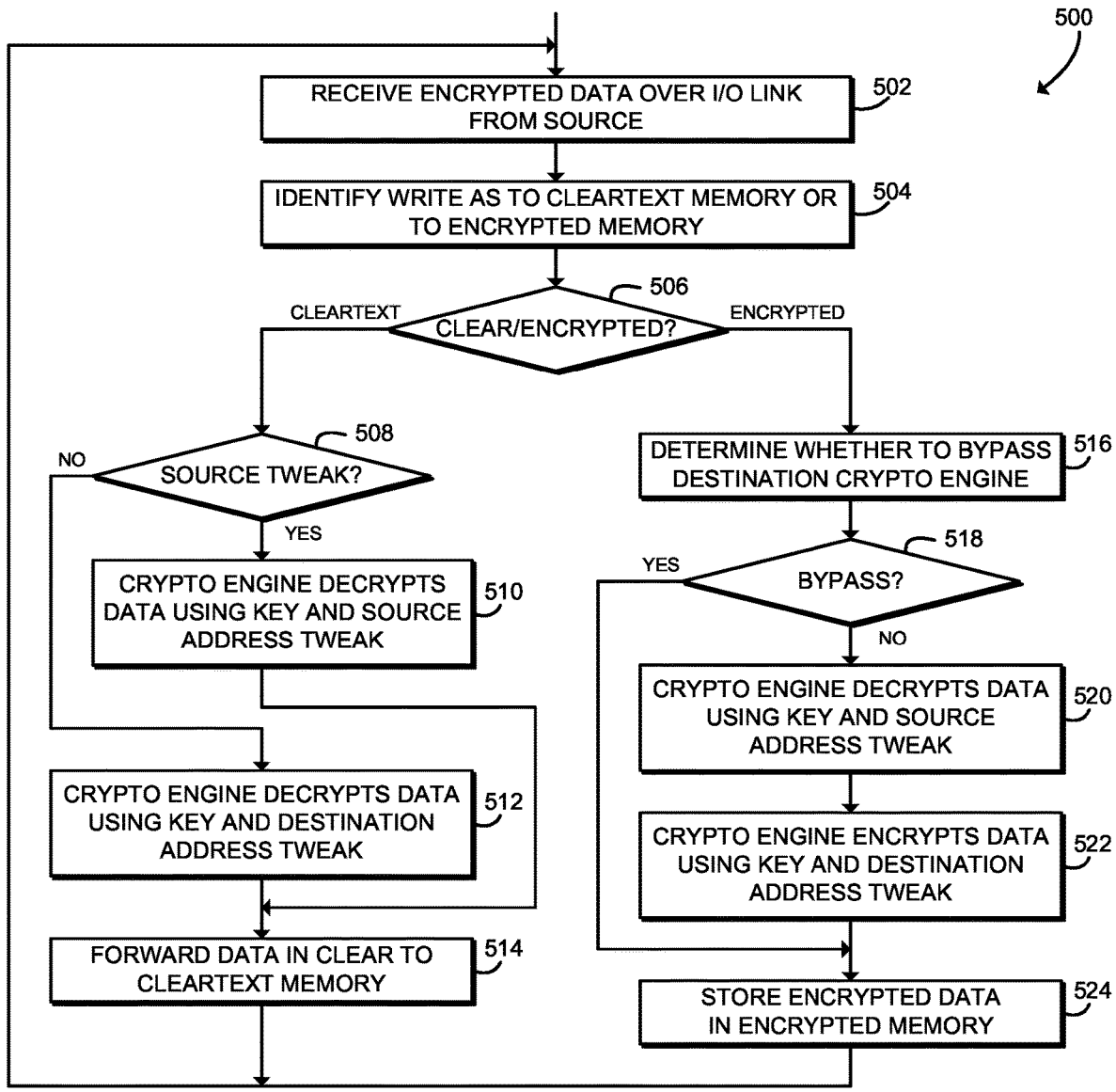
FIG. 5 is a simplified flow diagram of at least one embodiment of a method for destination component transfers that may be executed by the computing device of FIGS. 1-2.

Referring now to FIG. 5, in use, the computing device 100 may execute a method 500 for destination component transfers. It should be appreciated that, in some embodiments, the operations of the method 500 may be performed by one or more components of the environment 200 of the computing device 100 as shown in FIG. 2, such as the destination 214 (e.g., the processor 120 or the accelerator 134). The method 500 begins in block 502, in which the destination 214 receives encrypted data over the I/O link 142 from the source 206. As described above in connection with FIG. 4, the encrypted data is encrypted with an encryption key shared by the source 206 and the destination 214 and a tweak. The tweak may be a source address tweak, for example when the memory encryption engine 208 of the source 206 was bypassed, or may be a destination address tweak. The encrypted data may be included in a memory-mapped I/O transaction, a direct memory access (DMA) transaction, or other data transfer.

In block 504, the destination 214 determines whether the memory transfer is a write to a cleartext memory 218 of the destination 214 or to an encrypted memory 220 of the destination 214. As described above, the cleartext memory 218 may be embodied as any register, cache, private memory, or other memory of the destination 214 (e.g., the processor 120 or the accelerator 134) that may securely store data in cleartext (i.e., not encrypted). The encrypted memory 220 may be embodied as any memory or other storage coupled to the destination 214 that is encrypted at rest to protect from certain hardware attacks (e.g., the memory 128 coupled to the processor 120 or the memory 138 coupled to the accelerator 134). In block 506 the destination 214 checks whether the write is to cleartext memory 218 or to encrypted memory 220. If the write is to encrypted memory 220, the method 500 branches to block 516, described below. If the write is to cleartext memory 218, the method 500 branches to block 508.

In block 508, the memory encryption engine 216 determines whether a source address tweak is available for the data transfer. The tweak may be embodied as, for example, a host physical address for the encrypted data in the encrypted memory 212 of the source 206. Whether the source tweak is known by the memory encryption engine 216 of the destination 214 may depend on the originator of the data transfer relative to the source 206 and the destination 214, for example whether the operation is a "read" or a "write" from the perspective of the source 206 and the destination 214. For example, if the data transfer is a "write" (originated by the source 206), the destination 214 may not know the source address tweak. If the transfer is a "read" (originated by the destination 214), the destination 214 may know the source address associated with the transfer.

If the source address tweak is available, the method 500 branches to block 510, in which the memory encryption engine 216 decrypts the encrypted data using the shared encryption key and the source address tweak, which recovers cleartext data. For example, the source address tweak may be a host physical address for the encrypted memory at the source 206. The source tweak may be used when the memory encryption engine 208 is bypassed and the encrypted data is read directly from the encrypted memory 212, which may save at least one encryption and one decryption operation as compared to not bypassing the memory encryption engine 208. As another example, the source tweak may be used if the data originates from cleartext memory 210 at the source 206 and is encrypted by the memory encryption engine 208 with the source tweak to provide link encryption. After decrypting the data, the method 500 advances to block 514, described below.

Referring back to block 508, if the source address tweak is not available, the method 500 branches to block 512, in which the memory encryption engine 216 decrypts the encrypted data using the shared encryption key and a destination address tweak, such as a host physical address for the encrypted memory at the destination 214. For example, the destination tweak may be used if the data originates from cleartext memory 210 at the source 206 but is encrypted by the memory encryption engine 208 with the destination tweak to provide link encryption. After decrypting the data, the method 500 advances to block 514.

In block 514, after decryption, the memory encryption engine 216 forwards the cleartext data to cleartext memory 218 of the destination 214 (e.g., the processor 120 or the accelerator 134). The cleartext data may be provided to a cache memory, a register, or another private memory of the destination 214. The cleartext data is thus protected from unauthorized disclosure to other components of the computing device 100. After being stored in the cleartext memory 218, an application executed by the computing device 100 may access the cleartext data without further decryption operations. For example, application software executed by the processor 120 may access cleartext data from one or more registers or cache of the processor 120. As another example, an application function unit or other part of the accelerator 134 may access cleartext data from one or more registers or private memory of the accelerator 134. After forwarding the cleartext data, the method 500 loops back to block 502 to process additional encrypted data transfers.

Referring back to block 506, if the write is to encrypted memory 220, the method 500 branches to block 516, in which the destination 214 determines whether to bypass the memory encryption engine 216. As described above, the determination of whether to bypass the memory encryption engine 216 may depend on which of the source 206 and/or the destination 214 knows the source address tweak and/or destination address tweak associated with the data transfer. As described above, whether the source or destination tweak is available to the source 206 or destination 214 may depend on the originator of the data transfer relative to the source 206 and the destination 214. For example, for a "read," the destination 214 may know the source address of the data transfer, and thus the source memory encryption engine 208 may be bypassed. As another example, for a "write," the source 206 may know the destination address of the data transfer, and thus the destination memory encryption engine 216 may be bypassed. Accordingly, in some embodiments, the memory encryption engine 216 may not be bypassed for transfers from the encrypted memory 212 of the source 206 to cleartext memory 218 of the destination 214, and the memory encryption engine 216 may be bypassed for transfers from the encrypted memory 212 of the source 206 to encrypted memory 220 of the destination 214 (e.g., DMA transfers).

In block 518, the destination 214 checks whether to bypass the memory encryption engine 216. If so, the method 500 branches to block 524, in which the destination 214 stores the encrypted data in the encrypted memory 220 of the destination 214. The encrypted data may be stored in, for example, the memory 128 or the memory 138 coupled to the accelerator 134. The encrypted data as stored is encrypted by the shared encryption key and a destination address tweak. Thus, the encryption was performed by the source memory encryption engine 208 with the destination address tweak, which allowed bypass of the destination memory encryption engine 216 and saved at least one encryption operation and one decryption operation. After the encrypted data is stored, the destination 214 may access the encrypted data using the memory encryption engine 216 as in typical accesses to encrypted memory (e.g., using the MKTME 126, 136). After storing the encrypted data, the method 500 loops back to block 502 to process additional encrypted data transfers.

Referring back to block 518, if the destination 214 determines not to bypass the memory encryption engine 216, the method 500 advances to block 520. In block 520, the memory encryption engine 216 decrypts the encrypted data using the shared encryption key and a source address tweak, which recovers the cleartext data. The source address tweak may be embodied as, for example, a host physical address of the encrypted data in an encrypted memory 212 of the source 206. By performing decryption at the destination 214, the source 206 may have been able to bypass the memory encryption engine 208 as described above. In block 522, the memory encryption engine 216 encrypts the cleartext data using the shared encryption key and a destination address tweak. The tweak may be embodied as, for example, a host physical address for the encrypted data in the encrypted memory 220 of the destination 214. Additionally or alternatively, although illustrated as including a single memory encryption engine 216 that performs two cryptographic operations in blocks 520, 522, it should be understood that in some embodiments the destination 214 may include two memory encryption engines to perform those operations. After encrypting the data, the method 500 advances to block 524, in which the destination 214 stores the encrypted data in the encrypted memory 220 of the destination 214 as described above. After storing the encrypted data, the method 500 loops back to block 502 to process additional encrypted data transfers.

It should be appreciated that, in some embodiments, the methods 300, 400, and/or 500 may be embodied as various instructions stored on a computer-readable media, which may be executed by the processor 120, the I/O subsystem 124, the accelerator 134, the MKTME 126, 136, and/or other components of the computing device 100 to cause the computing device 100 to perform the respective method 300, 400, and/or 500. The computer-readable media may be embodied as any type of media capable of being read by the computing device 100 including, but not limited to, the memory 128, the data storage device 130, firmware devices, other memory or data storage devices of the computing device 100, portable media readable by a peripheral device 140 of the computing device 100, and/or other media.

EXAMPLES

Illustrative examples of the technologies disclosed herein are provided below. An embodiment of the technologies may include any one or more, and any combination of, the examples described below.

Example 1 includes a computing device for secure data transfer, the computing device comprising: a first memory encryption engine and a second encryption engine; a transfer manager to (i) configure the first memory encryption engine and the second memory encryption engine with a first encryption key and (ii) transfer encrypted data from a source component to a destination component via an I/O link between the source component and the destination component, wherein the encrypted data is encrypted with the first encryption key; and bypass control logic to bypass the second memory encryption engine; wherein the first memory encryption engine is to perform a cryptographic operation related to the encrypted data using the first encryption key.

Example 2 includes the subject matter of Example 1, and wherein: the source component comprises the first memory encryption engine; the destination component comprises the second memory encryption engine; to transfer the encrypted data comprises to transfer the encrypted data in response to performance of the cryptographic operation; and to bypass the second memory encryption engine comprises to bypass the second memory encryption engine in response to transfer of the encrypted data.

Example 3 includes the subject matter of any of Examples 1 and 2, and wherein: the first memory encryption engine is further to read cleartext data from a cleartext memory of the source component; the bypass control logic is further to store the encrypted data in an encrypted memory coupled to the destination component in response to bypass of the second memory encryption engine; and to perform the cryptographic operation comprises to encrypt the cleartext data using the first encryption key and a tweak associated with the destination component in response to a read of the cleartext data.

Example 4 includes the subject matter of any of Examples 1-3, and wherein: the first memory encryption engine is further to (i) read the encrypted data from an encrypted memory coupled to the source component and (ii) perform a second cryptographic operation related to the encrypted data using the first encryption key in response to performance of the cryptographic operation; the bypass control logic is further to store the encrypted data in an encrypted memory coupled to the destination component in response to bypass of the second memory encryption engine; to perform the cryptographic operation comprises to decrypt the encrypted data to recover cleartext data using the first encryption key and a tweak associated with the source component in response to a read of the encrypted data; to perform the second cryptographic operation comprises to encrypt the cleartext data using the first encryption key and a tweak associated with the destination component; and to transfer the encrypted data comprises to transfer the encrypted data in response to performance of the second cryptographic operation.

Example 5 includes the subject matter of any of Examples 1-4, and wherein: the source component comprises the second memory encryption engine; the destination component comprises the first memory encryption engine; to transfer the encrypted data comprises to transfer the encrypted data in response to bypass of the second memory encryption engine; and to perform the cryptographic operation comprises to perform the cryptographic operation in response to transfer of the encrypted data.

Example 6 includes the subject matter of any of Examples 1-5, and wherein: the bypass control logic is to read the encrypted data from an encrypted memory coupled to the source component; the first memory encryption engine is further to store cleartext data in a cleartext memory of the destination component in response to performance of the cryptographic operation; to bypass the second memory encryption engine comprises to bypass the second memory encryption engine in response to a read of the encrypted data; and to perform the cryptographic operation comprises to decrypt the encrypted data to recover the cleartext data using the first encryption key and a tweak associated with the source component.

Example 7 includes the subject matter of any of Examples 1-6, and wherein: the bypass control logic is to read the encrypted data from an encrypted memory coupled to the source component; the first memory encryption engine is to (i) perform a second cryptographic operation related to the encrypted data using the first encryption key in response to performance of the cryptographic operation, and (ii) store the encrypted data in an encrypted memory coupled to the destination component in response to performance of the second cryptographic operation; to bypass the second memory encryption engine comprises to bypass the second memory encryption engine in response to a read of the encrypted data; to perform the cryptographic operation comprises to decrypt the encrypted data to recover cleartext data using the first encryption key and a tweak associated with the source component; and to perform the second cryptographic operation comprises to encrypt the cleartext data using the first encryption key and a tweak associated with the destination component.

Example 8 includes the subject matter of any of Examples 1-7, and wherein: the bypass control logic is to determine whether to bypass the second memory encryption engine; and the second memory encryption engine is to perform a second cryptographic operation related to the encrypted data using the first encryption key in response to a determination not to bypass the second memory encryption engine; the source component comprises the first memory encryption engine; the destination component comprises the second memory encryption engine; and to transfer the encrypted data comprises to transfer the encrypted data in response to performance of the cryptographic operation.

Example 9 includes the subject matter of any of Examples 1-8, and wherein: the first memory encryption engine is further to read cleartext data from a cleartext memory of the source component; the second memory encryption engine is further to store the cleartext data in a cleartext memory of the destination component in response to performance of the second cryptographic operation; to perform the cryptographic operation comprises to encrypt the cleartext data using the first encryption key in response to a read of the cleartext data; and to perform the second cryptographic operation comprises to decrypt the encrypted data to recover the cleartext data using the first encryption key.

Example 10 includes the subject matter of any of Examples 1-9, and wherein: to perform the cryptographic operation further comprises to encrypt the cleartext data using the first encryption key and a tweak associated with the source component; and to perform the second cryptographic operation comprises to decrypt the encrypted data using the first encryption key and the tweak associated with the source component.

Example 11 includes the subject matter of any of Examples 1-10, and wherein: to perform the cryptographic operation further comprises to encrypt the cleartext data using the first encryption key and a tweak associated with the destination component; and to perform the second cryptographic operation comprises to decrypt the encrypted data using the first encryption key and the tweak associated with the destination component.

Example 12 includes the subject matter of any of Examples 1-11, and wherein: the bypass control logic is further to determine whether to bypass the second memory encryption engine; and to bypass the second memory encryption engine comprises to bypass the second memory encryption engine in response to a determination to bypass the second memory encryption engine.

Example 13 includes the subject matter of any of Examples 1-12, and wherein to determine whether to bypass the second memory encryption engine comprises to determine whether to bypass the second memory encryption engine based on a device configuration of the source component or a device configuration of the destination component.

Example 14 includes the subject matter of any of Examples 1-13, and wherein to determine whether to bypass the second memory encryption engine comprises to determine whether to bypass the second memory encryption engine based on a memory address associated with the encrypted data.

Example 15 includes the subject matter of any of Examples 1-14, and wherein to determine whether to bypass the second memory encryption engine comprises to determine whether a tweak associated with the encrypted data is available to the first memory encryption engine.

Example 16 includes the subject matter of any of Examples 1-15, and wherein: the computing device comprises a processor and an accelerator, wherein the I/O link is coupled between the processor and the accelerator; the source component comprises the processor or the accelerator; the destination component comprises the processor or the accelerator; the first memory encryption engine comprises a memory encryption engine of the processor or a memory encryption engine of the accelerator; and the second memory encryption engine comprises the memory encryption engine of the processor or the memory encryption engine of the accelerator other than the first memory encryption engine.

Example 17 includes the subject matter of any of Examples 1-16, and wherein the I/O link comprises a PCI link or an accelerator device link.

Example 18 includes a method for secure data transfer, the method comprising: configuring, by a computing device, a first memory encryption engine of the computing device and a second memory encryption engine of the computing device with a first encryption key; transferring, by the computing device, encrypted data from a source component to a destination component via an I/O link between the source component and the destination component, wherein the encrypted data is encrypted with the first encryption key; performing, by the first memory encryption engine, a cryptographic operation related to the encrypted data using the first encryption key; and bypassing, by the computing device, the second memory encryption engine.

Example 19 includes the subject matter of Example 18, and wherein: the source component comprises the first memory encryption engine; the destination component comprises the second memory encryption engine; transferring the encrypted data comprises transferring the encrypted data in response to performing the cryptographic operation; and bypassing the second memory encryption engine comprises bypassing the second memory encryption engine in response to transferring the encrypted data.

Example 20 includes the subject matter of any of Examples 18 and 19, and further comprising: reading, by the computing device, cleartext data from a cleartext memory of the source component; and storing, by the computing device, the encrypted data in an encrypted memory coupled to the destination component in response to bypassing the second memory encryption engine; wherein performing the cryptographic operation comprises encrypting the cleartext data using the first encryption key and a tweak associated with the destination component in response to reading the cleartext data.

Example 21 includes the subject matter of any of Examples 18-20, and further comprising: reading, by the computing device, the encrypted data from an encrypted memory coupled to the source component; performing, by the first memory encryption engine, a second cryptographic operation related to the encrypted data using the first encryption key in response to performing the cryptographic operation; and storing, by the computing device, the encrypted data in an encrypted memory coupled to the destination component in response to bypassing the second memory encryption engine; wherein performing the cryptographic operation comprises decrypting the encrypted data to recover cleartext data using the first encryption key and a tweak associated with the source component in response to reading the encrypted data; wherein performing the second cryptographic operation comprises encrypting the cleartext data using the first encryption key and a tweak associated with the destination component; and wherein transferring the encrypted data comprises transferring the encrypted data in response to performing the second cryptographic operation.

Example 22 includes the subject matter of any of Examples 18-21, and wherein: the source component comprises the second memory encryption engine; the destination component comprises the first memory encryption engine; transferring the encrypted data comprises transferring the encrypted data in response to bypassing the second memory encryption engine; and performing the cryptographic operation comprises performing the cryptographic operation in response to transferring the encrypted data.

Example 23 includes the subject matter of any of Examples 18-22, and further comprising: reading, by the computing device, the encrypted data from an encrypted memory coupled to the source component; and storing, by the computing device, cleartext data in a cleartext memory of the destination component in response to performing the cryptographic operation; wherein bypassing the second memory encryption engine comprises bypassing the second memory encryption engine in response to reading the encrypted data; and wherein performing the cryptographic operation comprises decrypting the encrypted data to recover the cleartext data using the first encryption key and a tweak associated with the source component.

Example 24 includes the subject matter of any of Examples 18-23, and further comprising: reading, by the computing device, the encrypted data from an encrypted memory coupled to the source component; performing, by the first memory encryption engine, a second cryptographic operation related to the encrypted data using the first encryption key in response to performing the cryptographic operation; and storing, by the computing device, the encrypted data in an encrypted memory coupled to the destination component in response to performing the second cryptographic operation; wherein bypassing the second memory encryption engine comprises bypassing the second memory encryption engine in response to reading the encrypted data; wherein performing the cryptographic operation comprises decrypting the encrypted data to recover cleartext data using the first encryption key and a tweak associated with the source component; and wherein performing the second cryptographic operation comprises encrypting the cleartext data using the first encryption key and a tweak associated with the destination component.

Example 25 includes the subject matter of any of Examples 18-24, and further comprising: determining, by the computing device, whether to bypass the second memory encryption engine; and performing, by the second memory encryption engine, a second cryptographic operation related to the encrypted data using the first encryption key in response to determining not to bypass the second memory encryption engine; wherein the source component comprises the first memory encryption engine; wherein the destination component comprises the second memory encryption engine; and wherein transferring the encrypted data comprises transferring the encrypted data in response to performing the cryptographic operation.

Example 26 includes the subject matter of any of Examples 18-25, and further comprising: reading, by the computing device, cleartext data from a cleartext memory of the source component; and storing, by the computing device, the cleartext data in a cleartext memory of the destination component in response to performing the second cryptographic operation; wherein performing the cryptographic operation comprises encrypting the cleartext data using the first encryption key in response to reading the cleartext data; and wherein performing the second cryptographic operation comprises decrypting the encrypted data to recover the cleartext data using the first encryption key.

Example 27 includes the subject matter of any of Examples 18-26, and wherein: performing the cryptographic operation further comprises encrypting the cleartext data using the first encryption key and a tweak associated with the source component; and performing the second cryptographic operation comprises decrypting the encrypted data using the first encryption key and the tweak associated with the source component.

Example 28 includes the subject matter of any of Examples 18-27, and wherein: performing the cryptographic operation further comprises encrypting the cleartext data using the first encryption key and a tweak associated with the destination component; and performing the second cryptographic operation comprises decrypting the encrypted data using the first encryption key and the tweak associated with the destination component.

Example 29 includes the subject matter of any of Examples 18-28, and further comprising: determining, by the computing device, whether to bypass the second memory encryption engine; wherein bypassing the second memory encryption engine comprises bypassing the second memory encryption engine in response to determining to bypass the second memory encryption engine.

Example 30 includes the subject matter of any of Examples 18-29, and wherein determining whether to bypass the second memory encryption engine comprises determining whether to bypass the second memory encryption engine based on a device configuration of the source component or a device configuration of the destination component.

Example 31 includes the subject matter of any of Examples 18-30, and wherein determining whether to bypass the second memory encryption engine comprises determining whether to bypass the second memory encryption engine based on a memory address associated with the encrypted data.

Example 32 includes the subject matter of any of Examples 18-31, and wherein determining whether to bypass the second memory encryption engine comprises determining whether a tweak associated with the encrypted data is available to the first memory encryption engine.

Example 33 includes the subject matter of any of Examples 18-32, and wherein: the computing device comprises a processor and an accelerator, wherein the I/O link is coupled between the processor and the accelerator; the source component comprises the processor or the accelerator; the destination component comprises the processor or the accelerator; the first memory encryption engine comprises a memory encryption engine of the processor or a memory encryption engine of the accelerator; and the second memory encryption engine comprises the memory encryption engine of the processor or the memory encryption engine of the accelerator other than the first memory encryption engine.

Example 34 includes the subject matter of any of Examples 18-33, and wherein the I/O link comprises a PCI link or an accelerator device link.

Example 35 includes a computing device comprising: a processor; and a memory having stored therein a plurality of instructions that when executed by the processor cause the computing device to perform the method of any of Examples 18-34.

Example 36 includes one or more non-transitory, computer readable storage media comprising a plurality of instructions stored thereon that in response to being executed result in a computing device performing the method of any of Examples 18-34.

Example 37 includes a computing device comprising means for performing the method of any of Examples 18-34.

What is claimed is:

1. An apparatus comprising:
   processor circuitry coupled to a memory; and
   a first memory encryption engine circuitry and a second encryption engine circuitry coupled to the processor circuitry;
   transfer manager circuitry to configure the first memory encryption engine circuitry and the second memory encryption engine circuitry with a first encryption key and transfer encrypted data from a source component to a destination component via an input/output (I/O) link between the source component and the destination component, wherein the encrypted data is encrypted with the first encryption key; and
   bypass control circuitry to bypass the second memory encryption engine circuitry in response to a transfer of the encrypted data and a determination that a tweak is available to the first memory encryption engine, wherein the encrypted data is to be stored in response to bypassing of the second memory encryption engine circuitry; and
   wherein the first memory encryption engine circuitry is to perform a cryptographic operation in response to a determination to not bypass the first memory encryption engine circuitry,
   wherein the cryptographic operation relates to the encrypted data using the first encryption key, wherein the first memory encryption engine circuitry is to read cleartext data from a cleartext memory of the source component, and wherein to perform the cryptographic operation includes to encrypt the cleartext data using the first encryption key and a tweak information associated with the destination component in response to a read of the cleartext data, wherein the source component comprises the first memory encryption engine circuitry, wherein the destination component comprises the second memory encryption engine circuitry, and wherein the encrypted data is transferred in response to performance of the cryptographic operation.

2. The apparatus of claim 1, wherein the processor circuitry is to: (i) read the encrypted data from an encrypted memory coupled to the source component and (ii) perform a second cryptographic operation related to the encrypted data using the first encryption key in response to performance of the cryptographic operation; store the encrypted data in an encrypted memory coupled to the destination component in response to bypass of the second memory encryption engine circuitry; wherein to perform the cryptographic operation comprises to decrypt the encrypted data to recover cleartext data using the first encryption key and a tweak associated with the source component in response to a read of the encrypted data; wherein to perform the second cryptographic operation comprises to encrypt the cleartext data using the first encryption key and a tweak associated with the destination component; and wherein to transfer the encrypted data comprises to transfer the encrypted data in response to performance of the second cryptographic operation.

3. The apparatus of claim 1, wherein:
the source component comprises the second memory encryption engine circuitry;
the destination component comprises the first memory encryption engine circuitry;
to transfer the encrypted data comprises to transfer the encrypted data in response to bypass of the second memory encryption engine circuitry; and
to perform the cryptographic operation comprises to perform the cryptographic operation in response to transfer of the encrypted data.

4. The apparatus of claim 3, wherein the processor circuitry is to:
read the encrypted data from an encrypted memory coupled to the source component;
store cleartext data in a cleartext memory of the destination component in response to performance of the cryptographic operation;
wherein to bypass the second memory encryption engine circuitry comprises to bypass the second memory encryption engine circuitry in response to a read of the encrypted data; and
wherein to perform the cryptographic operation comprises to decrypt the encrypted data to recover the cleartext data using the first encryption key and a tweak associated with the source component.

5. The apparatus of claim 3, wherein the processor circuitry is to:
read the encrypted data from an encrypted memory coupled to the source component;
(i) perform a second cryptographic operation related to the encrypted data using the first encryption key in response to performance of the cryptographic operation, and (ii) store the encrypted data in an encrypted memory coupled to the destination component in response to performance of the second cryptographic operation;
wherein to bypass the second memory encryption engine circuitry comprises to bypass the second memory encryption engine circuitry in response to a read of the encrypted data;
wherein to perform the cryptographic operation comprises to decrypt the encrypted data to recover cleartext data using the first encryption key and a tweak associated with the source component; and
wherein to perform the second cryptographic operation comprises to encrypt the cleartext data using the first encryption key and a tweak associated with the destination component.

6. The apparatus of claim 1, wherein the processor circuitry is to:
determine whether to bypass the second memory encryption engine circuitry; and
perform a second cryptographic operation related to the encrypted data using the first encryption key in response to a determination not to bypass the second memory encryption engine circuitry;
wherein the source component comprises the first memory encryption engine circuitry;
wherein the destination component comprises the second memory encryption engine circuitry; and
to transfer the encrypted data comprises to transfer the encrypted data in response to performance of the cryptographic operation.

7. The apparatus of claim 6, wherein the processor circuitry is to:
read cleartext data from a cleartext memory of the source component;
store the cleartext data in a cleartext memory of the destination component in response to performance of the second cryptographic operation;
wherein to perform the cryptographic operation comprises to encrypt the cleartext data using the first encryption key in response to a read of the cleartext data; and
wherein to perform the second cryptographic operation comprises to decrypt the encrypted data to recover the cleartext data using the first encryption key.

8. The apparatus of claim 1, wherein the processor circuitry is to:
determine whether to bypass the second memory encryption engine circuitry; and
wherein to bypass the second memory encryption engine circuitry comprises to bypass the second memory encryption engine circuitry in response to a determination to bypass the second memory encryption engine circuitry, wherein to determine whether to bypass the second memory encryption engine circuitry comprises to determine whether to bypass the second memory encryption engine circuitry based on a memory address associated with the encrypted data, wherein to determine whether to bypass the second memory encryption engine circuitry comprises to determine whether a tweak associated with the encrypted data is available to the first memory encryption engine circuitry.

9. The apparatus of claim 1, wherein:
the processor circuitry are coupled to an accelerator, wherein the I/O link is coupled between the processor circuitry and the accelerator;
the source component comprises the processor circuitry or the accelerator;
the destination component comprises the processor circuitry or the accelerator;

the first memory encryption engine circuitry comprises a memory encryption engine circuitry of the processor or a memory encryption engine circuitry of the accelerator; and the second memory encryption engine circuitry comprises the memory encryption engine circuitry of the processor or the memory encryption engine circuitry of the accelerator other than the first memory encryption engine circuitry.

10. A method comprising:

configuring a first memory encryption engine circuitry of a computing device and a second memory encryption engine circuitry of the computing device with a first encryption key;

transferring encrypted data from a source component to a destination component via an I/O link between the source component and the destination component, wherein the encrypted data is encrypted with the first encryption key; and bypassing the second memory encryption engine circuitry in response to transferring the encrypted data and determining that a tweak is available to the first memory encryption engine, wherein the encrypted data is stored in response to bypassing of the second memory encryption engine circuitry; and performing a cryptographic operation in response to a determination to not bypass the first memory encryption engine circuitry, wherein the cryptographic operation relates to the encrypted data using the first encryption key, wherein the first memory encryption engine circuitry to read cleartext data from a cleartext memory of the source component, and wherein performing the cryptographic operation includes encrypting the cleartext data using the first encryption key and a tweak information associated with the destination component in response to a read of the cleartext data, wherein the source component comprises the first memory encryption engine circuitry, wherein the destination component comprises the second memory encryption engine circuitry, and wherein the encrypted data is transferred in response to performance of the cryptographic operation.

11. The method of claim 10, further comprising:

reading the encrypted data from an encrypted memory coupled to the source component;

performing a second cryptographic operation related to the encrypted data using the first encryption key in response to performing the cryptographic operation; and storing the encrypted data in an encrypted memory coupled to the destination component in response to bypassing the second memory encryption engine circuitry;

wherein performing the cryptographic operation comprises decrypting the encrypted data to recover cleartext data using the first encryption key and a tweak associated with the source component in response to reading the encrypted data;

wherein performing the second cryptographic operation comprises encrypting the cleartext data using the first encryption key and a tweak associated with the destination component; and wherein transferring the encrypted data comprises transferring the encrypted data in response to performing the second cryptographic operation.

12. The method of claim 10, wherein:

the source component comprises the second memory encryption engine circuitry;

the destination component comprises the first memory encryption engine circuitry;

transferring the encrypted data comprises transferring the encrypted data in response to bypassing the second memory encryption engine circuitry; and performing the cryptographic operation comprises performing the cryptographic operation in response to transferring the encrypted data.

13. The method of claim 12, further comprising:

reading the encrypted data from an encrypted memory coupled to the source component;

performing a second cryptographic operation related to the encrypted data using the first encryption key in response to performing the cryptographic operation; and storing the encrypted data in an encrypted memory coupled to the destination component in response to performing the second cryptographic operation;

wherein bypassing the second memory encryption engine comprises bypassing the second memory encryption engine circuitry in response to reading the encrypted data;

wherein performing the cryptographic operation comprises decrypting the encrypted data to recover cleartext data using the first encryption key and a tweak associated with the source component; and wherein performing the second cryptographic operation comprises encrypting the cleartext data using the first encryption key and a tweak associated with the destination component.

14. At least one computer-readable storage medium having stored thereon instructions which, when executed, cause a computing device to perform operations comprising:

configuring a first memory encryption engine circuitry of the computing device and a second memory encryption engine circuitry of the computing device with a first encryption key;

transferring encrypted data from a source component to a destination component via an I/O link between the source component and the destination component, wherein the encrypted data is encrypted with the first encryption key; and bypassing the second memory encryption engine circuitry in response to transferring the encrypted data and determining that a tweak is available to the first memory encryption engine, wherein the encrypted data is stored in response to bypassing of the second memory encryption engine circuitry; and performing a cryptographic operation in response to a determination to not bypass the first memory encryption engine circuitry, wherein the cryptographic operation relates to the encrypted data using the first encryption key, wherein the first memory encryption engine circuitry to read cleartext data from a cleartext memory of the source component, and wherein to perform the cryptographic operation includes to encrypt the cleartext data using the first encryption key and a tweak information associated with the destination component in response to a read of the cleartext data, wherein the source component comprises the first memory encryption engine circuitry, wherein the destination component comprises the second memory encryption engine circuitry, and wherein the encrypted data is transferred in response to performance of the cryptographic operation.

15. The computer-readable storage medium of claim 14, wherein the operations comprise:
- reading the encrypted data from an encrypted memory coupled to the source component;
- performing, by the first memory encryption engine circuitry, a second cryptographic operation related to the encrypted data using the first encryption key in response to performing the cryptographic operation; and
- storing the encrypted data in an encrypted memory coupled to the destination component in response to bypassing the second memory encryption engine circuitry;
- wherein to perform the cryptographic operation comprises to decrypt the encrypted data to recover cleartext data using the first encryption key and a tweak associated with the source component in response to reading the encrypted data;
- wherein to perform the second cryptographic operation comprises to encrypt the cleartext data using the first encryption key and a tweak associated with the destination component; and
- wherein to transfer the encrypted data comprises to transfer the encrypted data in response to performing the second cryptographic operation.

16. The computer-readable storage medium of claim 14, wherein:
- the source component comprises the second memory encryption engine circuitry;
- the destination component comprises the first memory encryption engine circuitry;
- transferring the encrypted data comprises transferring the encrypted data in response to bypassing the second memory encryption engine circuitry; and
- performing the cryptographic operation comprises performing the cryptographic operation in response to transferring the encrypted data.

17. The computer-readable storage medium of claim 14, wherein the operations comprise:
- reading the encrypted data from an encrypted memory coupled to the source component;
- performing a second cryptographic operation related to the encrypted data using the first encryption key in response to performing the cryptographic operation; and
- storing the encrypted data in an encrypted memory coupled to the destination component in response to performing the second cryptographic operation;
- wherein to bypass the second memory encryption engine circuitry comprises to bypass the second memory encryption engine circuitry in response to reading the encrypted data;
- wherein to perform the cryptographic operation comprises to decrypt the encrypted data to recover cleartext data using the first encryption key and a tweak associated with the source component; and
- wherein to perform the second cryptographic operation comprises to encrypt the cleartext data using the first encryption key and a tweak associated with the destination component.

\* \* \* \* \*